(12) United States Patent
Destraves et al.

(10) Patent No.: US 11,018,406 B2
(45) Date of Patent: May 25, 2021

(54) RADIOFREQUENCY COMMUNICATION MODULE FOR A TIRE

(71) Applicant: COMPAGNIE GENERALE DES ETABLISSEMENTS MICHELIN, Clermont-Ferrand (FR)

(72) Inventors: Julien Destraves, Clermont-Ferrand (FR); Annabel Tourenne, Clermont-Ferrand (FR); Sebastien Noel, Clermont-Ferrand (FR); Jean-Mathieu Clergeat, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 16/466,678

(22) PCT Filed: Nov. 30, 2017

(86) PCT No.: PCT/FR2017/053320
§ 371 (c)(1),
(2) Date: Jun. 5, 2019

(87) PCT Pub. No.: WO2018/104622
PCT Pub. Date: Jun. 14, 2018

(65) Prior Publication Data
US 2020/0067171 A1    Feb. 27, 2020

(30) Foreign Application Priority Data
Dec. 5, 2016   (FR) ...................................... 1661928

(51) Int. Cl.
*H01Q 1/22* (2006.01)
*B29D 30/00* (2006.01)
(Continued)

(52) U.S. Cl.
CPC ....... *H01Q 1/2241* (2013.01); *B29D 30/0061* (2013.01); *B29D 30/0601* (2013.01);
(Continued)

(58) Field of Classification Search
CPC ...... H01Q 1/2241; H01Q 11/08; H01Q 23/00; B29D 30/0061; B29D 30/0601; B60C 23/0452; B60C 23/0493; H04B 1/59
See application file for complete search history.

(56) References Cited

U.S. PATENT DOCUMENTS 5,196,845 A * 3/1993 Myatt ................. B60C 23/0427
340/870.31
6,326,925 B1   12/2001 Perkio et al.
(Continued)

FOREIGN PATENT DOCUMENTS

CN    1448284 A    10/2003
CN    1953881 A    4/2007
(Continued)

OTHER PUBLICATIONS

International Search Report dated Feb. 15, 2018, in corresponding PCT/FR2017/053320 (4 pages).

*Primary Examiner* — Nguyen T Vo
(74) *Attorney, Agent, or Firm* — Venable LLP

(57) ABSTRACT

A radiofrequency communication module or semi-finished product able to be integrated into the structure of a tire comprises a radiofrequency transponder embedded in a rubber blend and comprising an electronic chip and a radiating antenna that is able to communicate with a radiofrequency reader. The radiofrequency transponder in addition comprises a primary antenna that is electrically connected to the electronic chip, the primary antenna is electromagnetically coupled to the radiating antenna, the radiating antenna consists of a single-strand helical spring, and the radiating antenna has a core made of steel coated with a metal exterior
(Continued)

adhesion layer for adhesion to the rubber blend that surrounds it.

17 Claims, 5 Drawing Sheets

(51) Int. Cl.
  *B29D 30/06* (2006.01)
  *B60C 23/04* (2006.01)
  *H01Q 11/08* (2006.01)
  *H01Q 23/00* (2006.01)
  *H04B 1/59* (2006.01)

(52) U.S. Cl.
  CPC ...... *B60C 23/0452* (2013.01); *B60C 23/0493* (2013.01); *H01Q 11/08* (2013.01); *H01Q 23/00* (2013.01); *H04B 1/59* (2013.01); *B29D 2030/0077* (2013.01)

(56) References Cited

U.S. PATENT DOCUMENTS

| | | | |
|---|---|---|---|
| 6,546,982 | B1 | 4/2003 | Brown et al. |
| 6,772,505 | B1 | 8/2004 | Logan et al. |
| 6,836,253 | B2 | 12/2004 | Strache et al. |
| 6,899,153 | B1 | 5/2005 | Pollack et al. |
| 6,991,013 | B2 | 1/2006 | Poulbot et al. |
| 7,084,750 | B2 | 8/2006 | Johanning et al. |
| 7,102,499 | B2 | 9/2006 | Myatt |
| 7,391,307 | B2 | 6/2008 | Kuwajima |
| 7,453,407 | B2 | 11/2008 | Logan et al. |
| 8,319,659 | B2 | 11/2012 | Buck et al. |
| 8,593,357 | B2 | 11/2013 | Myatt |
| 9,070,069 | B2 | 6/2015 | Sinnett |
| 9,114,671 | B2 | 8/2015 | Adamson et al. |
| 9,679,174 | B2 | 6/2017 | Destraves et al. |
| 9,754,138 | B2 | 9/2017 | Destraves et al. |
| 2003/0085619 | A1 | 5/2003 | Strache et al. |
| 2003/0217797 | A1 | 11/2003 | Poulbot et al. |
| 2004/0252072 | A1* | 12/2004 | Adamson ............ B60C 11/00 343/873 |
| 2006/0208863 | A1 | 9/2006 | Kuwajima |
| 2007/0227644 | A1 | 10/2007 | Fagot-Revurat et al. |
| 2008/0289736 | A1 | 11/2008 | Adamson et al. |
| 2009/0058625 | A1 | 3/2009 | Suzuki et al. |
| 2010/0122757 | A1 | 5/2010 | Lionetti et al. |
| 2010/0123584 | A1 | 5/2010 | Lionetti et al. |
| 2010/0176969 | A1 | 7/2010 | Buck et al. |
| 2011/0175778 | A1 | 7/2011 | Myatt |
| 2012/0291936 | A1 | 11/2012 | Lionetti et al. |
| 2013/0153669 | A1* | 6/2013 | Sinnett ............ B60C 23/0452 235/492 |
| 2015/0217602 | A1 | 8/2015 | Salgues et al. |
| 2016/0176247 | A1 | 6/2016 | Cheikh et al. |
| 2017/0341323 | A1 | 11/2017 | Destraves et al. |
| 2018/0174015 | A1 | 6/2018 | Destraves |
| 2018/0264898 | A1 | 9/2018 | Lallement et al. |
| 2019/0322142 | A1 | 10/2019 | Lallement |
| 2019/0341673 | A1 | 11/2019 | Destraves |
| 2020/0062050 | A1 | 2/2020 | Destraves |
| 2020/0070598 | A1 | 3/2020 | Noel |
| 2020/0079159 | A1 | 3/2020 | Destraves |

FOREIGN PATENT DOCUMENTS

| | | |
|---|---|---|
| CN | 101279574 A | 10/2008 |
| CN | 101734112 A | 6/2010 |
| CN | 101801692 A | 8/2010 |
| CN | 103068598 A | 4/2013 |
| DE | 10 2007 043 077 A1 | 3/2009 |
| EP | 1 310 386 A2 | 5/2003 |
| EP | 1619052 A1 | 1/2006 |
| EP | 1977912 A1 | 10/2008 |
| EP | 2524818 A2 | 11/2012 |
| FR | 2936185 A1 | 3/2010 |
| JP | 2010-176454 A | 8/2010 |
| JP | 2011-195046 A | 10/2011 |
| JP | 2016-37236 A | 3/2016 |
| JP | 2016-49920 A | 4/2016 |
| WO | 2005/113262 A1 | 12/2005 |
| WO | 2012/030321 A1 | 3/2012 |
| WO | 2014/049058 A1 | 4/2014 |
| WO | 2016/193457 A1 | 12/2016 |

* cited by examiner

TELECOMMUNICATIONS

- PRODUCTION OF HELICAL SPRING
- RADIATING ANTENNA: CUTTING OF THE SPRING TO ONE HALF-WAVELENGTH

ELECTRONICS

- CONNECTION OF ELECTRONIC CHIP AND PRINTED CIRCUIT BOARD
- PRODUCTION OF PRIMARY ANTENNA
- CONNECTION OF PRIMARY ANTENNA AND ELECTRONIC BOARD
- ELECTRONIC PORTION: ENCAPSULATION OF ELECTRONIC BOARD IN A RIGID AND ELECTRICALLY INSULATING MATERIAL

ASSEMBLY

- PRODUCTION OF RADIOFREQUENCY TRANSPONDER: ASSOCIATION OF RADIATING ANTENNA AND ELECTRONIC PORTION
- PRODUCTION OF COMMUNICATION MODULE: INSERTION OF RADIOFREQUENCY TRANSPONDER INTO A SUPPLE AND INSULATING ELASTOMER

FIG. 9

RADIOFREQUENCY COMMUNICATION MODULE FOR A TIRE

FIELD OF THE INVENTION

The present invention relates to a radiofrequency communication module or semi-finished product able to be inserted into the structure of a tyre, comprising a radiofrequency transponder embedded in a rubber blend.

PRIOR ART

The development of electronic devices integrated into mounted assemblies, comprising a tyre and a wheel, as intensified over the last few years. Specifically, these electronic devices, such as for example radiofrequency transponders or RFID (acronym for radio-frequency identification) tags, contain information on the mounted assembly, such as the identifier of the tyre, its characteristic dimensions, etc. which are crucial data in the management and storage of such articles. In addition, these electronic devices may also measure parameters of the mounted assembly such as, for example, the temperature in the interior of the cavity formed by the tyre and the wheel rim in a mounted, pumped-up state. These parameters are essential to safe use of the mounted assembly. Communication with these electronic devices, in particular with respect to communication of parameters of the mounted assembly, is generally achieved by way of a radiofrequency transmission with exterior emitter/receiver devices.

The integration of such electronic devices into the mounted assembly and in particular into a tyre is not simple. Specifically, in order to ensure the reliability of the information contained in these electronic devices and in particular the information regarding the identifier of the tyre throughout the cycle of the product, it is preferable for the electronic device to be securely fastened to the tyre the identification information of which it contains. The integration of such electronic devices into the structure of a tyre poses a certain number of challenges. Firstly, the insertion of an electronic device into the structure of a tyre may lead to degradation of the tyre; it is therefore necessary to ensure that the tyre keeps its physical integrity throughout its life-cycle. The second relates to the radiocommunication performance of the electronic device. Specifically, the complex structure of an assembly mounted with, in particular, its stacks of rubber blends of different permittivities and its metal elements generate disruptions in the radiofrequency operation of the antenna of the electronic device in particular in the UHF (acronym of ultra-high-frequency) frequency band. Lastly, the third challenge consists in ensuring the physical integrity of the electronic device itself throughout the life-cycle of the tyre and in particular because of the high thermomechanical stresses undergone by the tyre under running conditions.

Document EP1977912 A1 describes a tyre comprising, in its structure, an electronic communication module comprising a radiofrequency transponder with an electronic chip and a radiating antenna able to communicate with a radiofrequency reader in which, the radiating antenna comprising two helical antenna segments, the electronic chip is galvanically connected to the two helical antenna segments.

BRIEF DESCRIPTION OF THE INVENTION

One subject of the invention is an electronic radiofrequency communication module or semi-finished product able to be integrated into the structure of a tyre, comprising a radiofrequency transponder embedded in a rubber blend and comprising an electronic chip and a radiating antenna that is able to communicate with a radiofrequency reader, wherein the radiofrequency transponder in addition comprises a primary antenna that is electrically connected to the electronic chip, wherein the primary antenna is electromagnetically coupled to the radiating antenna, wherein the radiating antenna consists of a single-strand helical spring, and wherein the radiating antenna has a core made of steel with a metal exterior adhesion layer for adhesion to the rubber blend that surrounds it.

Preferably, the metal adhesion layer of the radiating antenna is chosen from the group consisting of cobalt, zinc, nickel, aluminium, copper, tin and an alloy of two or more of the substances copper, zinc, aluminium, nickel, cobalt, and tin.

Advantageously, the rubber blend comprises an adhesion promoter for promoting adhesion with the adhesion layer of the radiating antenna.

This adhesion promoter may be a salt of cobalt or of nickel.

The integration of such an electronic module into a tyre allows the risk of deterioration of the device, because of its structure, to be decreased while improving radiocommunication performance and minimizing the related risks to the physical integrity of the tyre.

Specifically, deterioration of the electronic device is generally caused by failures in the electrical connection that exists between the communication radiating antenna and the electronic portion of the device. Here, no mechanical connection is required since the transfer of energy between the communication antenna and the electronic chip is achieved with an electromagnetic field, via a primary antenna. However, although the size of the radiating antenna, which is related to the frequency band of communication and to its far-field operation, is by nature large, the primary antenna is not subjected to this constraint. Thus it is of smaller size, in general allowing the deformations of the tyre to be easily endured without generation of excessively high mechanical stresses within the galvanic junction between it and the electronic chip. Lastly, the supple nature of the radiating antenna limits the risks of the deterioration of the zone of the tyre close to the transponder.

Secondly, the introduction of the primary antenna makes it possible to disassociate contradictory constraints on the size of the radiating antenna and the electrical impedance of the electronic portion of the device. Thus, it is possible to dimension the primary antenna in order to match its electrical impedance to that of the chip in order to minimize losses and to therefore improve the performance of the electronic device in terms of power consumption. The dimensions of the radiating antenna are then chosen solely with respect to the criterion of the communication frequency of the electronic device. All of this tends to improve the radiocommunication performance of the electronic device.

The single-strand radiating antenna of the transponder alone allows the transponder to be strongly mechanically anchored to the one or more adjacent rubber blends, but the presence of strong chemical bonds between the adhesion layer of the antenna and the rubber blend that surrounds it reinforces the resistance of the communication module to running stresses in a tyre and the resistance of the tyre that accommodates it.

Here, the term "radiofrequency transponder" is understood to mean that the interrogation of the radiofrequency transponder is carried out from the exterior thereof and passively. The phases of interrogation do not require the radiofrequency transponder to have its own power supply. The role of the radiofrequency transponder is mainly to identify the tyre casing.

In particular, the communication frequency of the radiofrequency transponder is located in the ultra-high-frequency (UHF) band comprised between 300 MHz and 3 GHz, allowing an advantageous compromise to be obtained between the size of the radiating antenna, which may be small, allowing the antenna to be easily integrated into a tyre casing, and the sizeable distance from which the radiofrequency transponder is readable, this distance possibly being far from the tyre casing. Advantageously, the radiofrequency transponder communicates in the narrow frequency band comprised between 860 MHz and 960 MHz and more specifically in the very narrow bands of 860 MHz to 870 MHz and 915 MHz to 925 MHz. Specifically, at these frequencies, for the conventional elastomer blends of tyre casings a good compromise is reached with respect to propagation of the electromagnetic waves. In addition, these frequencies are the highest possible in order to minimize the size of the radiating antenna in order to facilitate the integration of the radiofrequency transponder into the tyre casing.

According to one preferred embodiment, the radiating antenna defining a first longitudinal axis, the primary antenna is a coil having at least one turn defining a second longitudinal axis that is circumscribed in a cylinder the axis of revolution of which is parallel to the second longitudinal axis and the diameter of which is comprised between one third and three times, and preferably between half and two times, the average diameter of the helical spring of the radiating antenna.

Thus, the primary antenna being a loop antenna, energy is mainly transferred between the radiating antenna and the primary antenna by inductive coupling. This requires a certain proximity (in order to limit the gap between the two antennas) between the two antennas, requiring the coil of the primary antenna to be dimensioned, with respect to the radiating antenna, in order to ensure a transfer of energy that is sufficiently effective to obtain the desired radiocommunication quality. Concretely, the primary antenna may advantageously be of diameter smaller than that of the radiating antenna; in this case the entirety of the electronic portion of the transponder is inserted into the radiating antenna and the assembly is then particularly robust in an environment such as that of a tyre.

The antenna may also be of diameter larger than that of the radiating antenna; this case is particularly advantageous when it is desired to add, to the radiofrequency transponder, other, active or passive, electronic components in order to allow additional functions, such as for example surveillance of the state of the tyre, to be performed.

According to one advantageous embodiment, the radiating antenna having a central zone between two lateral zones and the primary antenna having a median plane perpendicular to the second longitudinal axis, the first and second longitudinal axes are parallel to each other and the median plane of the primary antenna is placed in the central zone of the radiating antenna.

The term "central zone" is here understood to mean the cylinder defined by the inside diameter of the helical spring located on either side of the median plane of the helical spring and the height of which corresponds to 25% of the length of the helical spring, and preferably to 15% of the length of the helical spring.

Thus, it is ensured that the distance between the radiating and primary antennas is constant along the longitudinal axes of these antennas, thus optimizing level with each element of length of the primary antenna an equivalent transfer of energy. In addition, the magnetic field created by a coil through which an electric current flows being maximum at the centre of the length of the coil (in the case of a λ/2 antenna), it is preferable to place the median plane of the primary antenna in the central zone of the radiating antenna and more preferably at the centre thereof in order to maximize the magnetic field that is the origin of the inductive coupling.

Advantageously, the rubber blend at least partially surrounding the radiofrequency transponder is formed from two layers and the radiofrequency transponder is placed between these two layers.

According to a first example embodiment, the radiating antenna defining the axial orientation of the radiofrequency communication module, the two layers are of same dimensions and are arranged staggered in a direction normal to the axial direction.

This allows, on the basis of a given layer geometry, a semi-finished product with interior and exterior surfaces of different areas to be obtained.

According to another embodiment, the radiating antenna defining the axial direction of the radiofrequency communication module and the two layers being of parallelepipedal shape and the upper layer being of smaller width, in any section normal to the axial direction the angle between the lower surface of the radiofrequency communication module and the tangent passing through the upper ends of the two layers is smaller than 40 degrees and preferably smaller than 35 degrees.

This geometry has the advantage of facilitating, during the placement of a module or semi-finished product in the structure of a tyre before curing, of facilitating the removal of air from between the two rubber interfaces that accommodate the module and thus of not degrading the integrity of the tyre when running.

Preferably, the blend that surrounds the transponder is an electrically insulating rubber blend. This makes it possible not to degrade the radiocommunication performance of the radiating antenna.

According to one embodiment, the rubber blend of the electronic module is not vulcanized.

This rubber blend may also be at least partially vulcanized.

Preferably, the rubber blend of the communication module has a dielectric constant at 915 MHz lower than 6.5.

Another subject of the invention is a process for manufacturing of an assembly consisting of a tyre and a radiofrequency transponder, wherein:
  all of the constituents of the tyre are successively placed on an assembling tool in order to form a green tyre;
  in one of the preceding assembly steps a radiofrequency communication module according to the invention is added to the surface of one of the constituents of the tyre; and
  the green tyre is vulcanized in order to obtain a vulcanized tyre comprising in its structure a radiofrequency transponder.

The invention particularly relates communication modules for tyres intended to be fitted onto motor vehicles of the passenger type, SUVs ("Sport Utility Vehicles"), two-wheel vehicles (especially bicycles and motorcycles), aircraft, or industrial vehicles chosen from vans, "heavy-duty" vehicles—that is to say underground trains, buses, heavy road transport vehicles (lorries, tractors, trailers), off-road vehicles, such as agricultural or civil engineering machines—and other transport or handling vehicles.

DESCRIPTION OF THE FIGURES

The various subjects of the invention will be better understood by means of the following detailed description and the attached drawings, the same reference numbers having been used in all the drawings to reference identical parts, and in which drawings:

FIG. 9 is an overview of a process for manufacturing an identification patch comprising a radiofrequency transponder according to the invention.

DETAILED DESCRIPTION OF THE INVENTION

Figure 1:
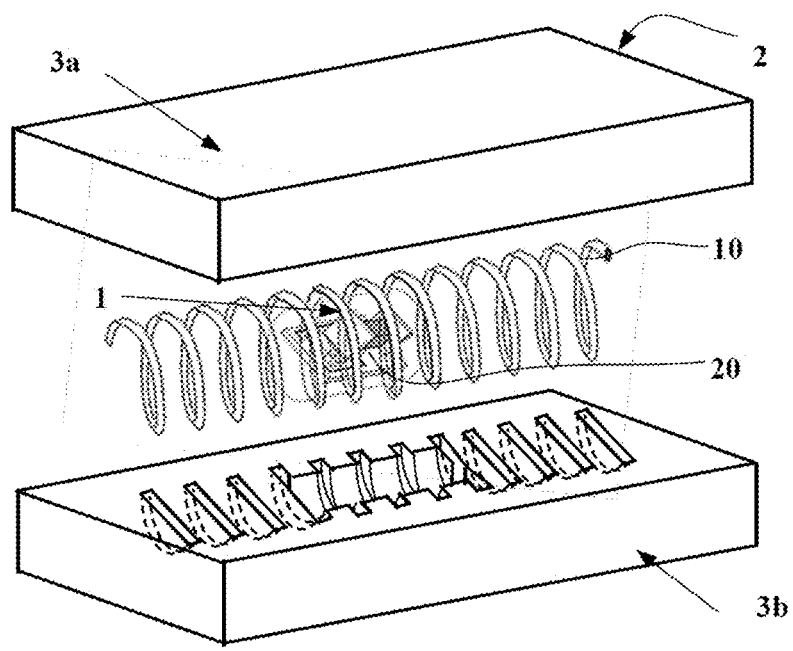
FIG. 1 is a schematic exploded view of a radiofrequency communication module.

FIG. 1 is a exploded view of a radiofrequency communication module 2. This module 2 comprises a radiofrequency transponder 1 embedded between two layers 3a and 3b of a non-vulcanized electrically insulating rubber blend. It will be noted that the radiofrequency transponder 1 is in a configuration in which the electronic portion 20 is located in the interior of the radiating antenna 10. The radiofrequency communication module is a semi-finished product able to be integrated into the structure of a tyre during the manufacture thereof.

The encapsulating rubber blend contains 100 phr (parts per 100 parts of elastomer by mass) of a polymer such as EPDM (ethylene propylene diene monomer rubber), butyl rubber, neoprene or a diene elastomer such as SBR (styrene-butadiene rubber), polybutadiene, natural rubber or polyisoprene.

The blend may contain fillers such as fillers of silica, carbon-black, chalk and kaolin type:
  with a filler of silica type in a maximum amount of 50 phr;
  with a filler of the type consisting of carbon black of ASTM grade higher than 700, in an amount lower than 50 phr;
  with a filler of the type consisting of carbon black of grade lower than or equal to 500, in a maximum amount of 20 phr.

It is possible to add or replace these fillers with chalk or kaolin.

Such amounts and types of fillers make it possible to guarantee a relative permittivity lower than 6.5, in particular at a frequency of 915 MHz.

The stiffness in the cured state of the encapsulating blend is preferably lower than or close to those of the adjacent blends.

The electrically insulating encapsulating blend also comprises an adhesion promoter in order to chemically bind it to the adhesion layer of the antenna.

This promoter may be a salt of cobalt or nickel, for example cobalt naphthenate in an amount lower than 3 phr and with a suitable amount of sulfur of about 5 to 7 phr.

Figure 2:
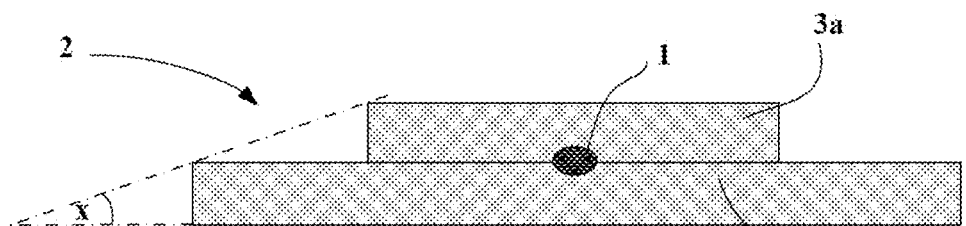
FIG. 2 shows, in cross section through a median plane one embodiment of a radiofrequency communication module.

FIG. 2 very schematically shows, as seen normal to the longitudinal axis defined by the single-strand radiating antenna of the radiofrequency transponder, a first example embodiment of a communication module. In this embodiment, the layer 3a has a transverse width smaller than the transverse width of the layer 3b and the transponder 1 is placed between the two layers 3a and 3b. The length of the layers is comprised between 40 and 80 mm. The transverse width of the layer 3a is, by way of example, about 8 mm and the transverse width of the layer 3b is about 15 mm. The thickness of the layers is about 3 mm.

It will be noted that the angle x between the interior surface of the layer 3b and the straight line passing through the two upper lateral ends of the layers 3a and 3b is smaller than 40 degrees and preferably smaller than 35 degrees in order to facilitate the removal of air during the placement of the module during the manufacture of the tyre.

Figure 3:
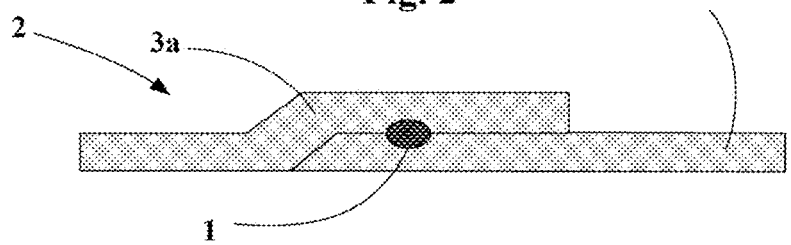
FIG. 3 shows, in cross section through a median plane a second embodiment of a radiofrequency communication module.

FIG. 3 is a second example embodiment of a radiofrequency communication module 2. In this example, the two layers 3a and 3b are of identical sizes and deposited partially one on the other staggered. The radiofrequency transponder is as above placed between the two layers of rubber blend. This allows the same communication-module geometry to be obtained.

Figure 4:
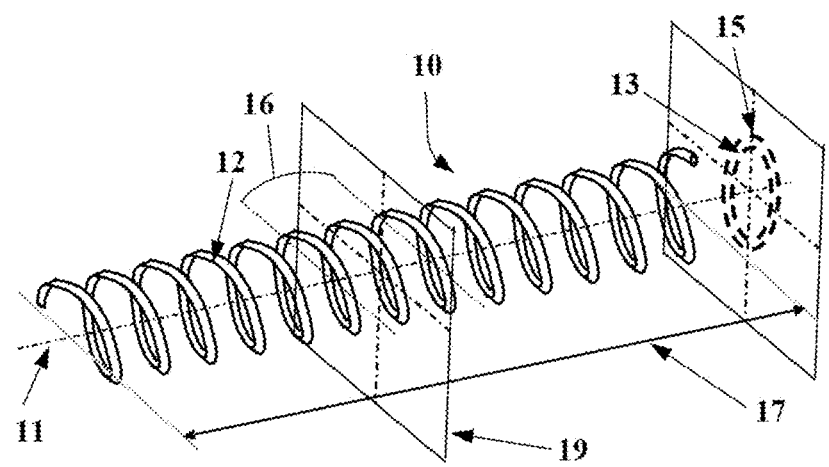
FIG. 4 is a detail view of a radiating antenna of a radiofrequency transponder according to the invention.

FIG. 4 shows a radiating antenna 10 consisting of a steel wire 12 that has been plastically deformed in order to form a helical spring having an axis of revolution 11. This steel wire is coated externally with a metal adhesion layer made of brass (Zn—Cu alloy) or zinc. The antenna may also be covered with a thin metal layer of Co, Ni, Al, or of an alloy of two or more of the substances Cu, Zn, Al, Ni, Co, and Sn as indicated in document WO 2014/049058.

The steel wire may be coated with this layer then formed; alternatively it may also be formed then coated.

The helical spring is primarily defined by a winding diameter of the coated wire and by a helix pitch. Thus, given the diameter of the wire, the inside diameter 13 and outside diameter 15 of the helical spring may be precisely determined. The length of the spring 17 here corresponds to one half-wavelength of the transmission signal of the radiofrequency transponder 1 in a rubber mass. It is furthermore possible to define a median plane 19 of the helical spring perpendicular to the axis of revolution 11 separating the radiating antenna into two equal portions. This plane is in the middle of a central zone 16 of the radiating antenna, this central zone 16 corresponding to about 25% of the total length of the antenna and preferably 15%.

Figure 5:
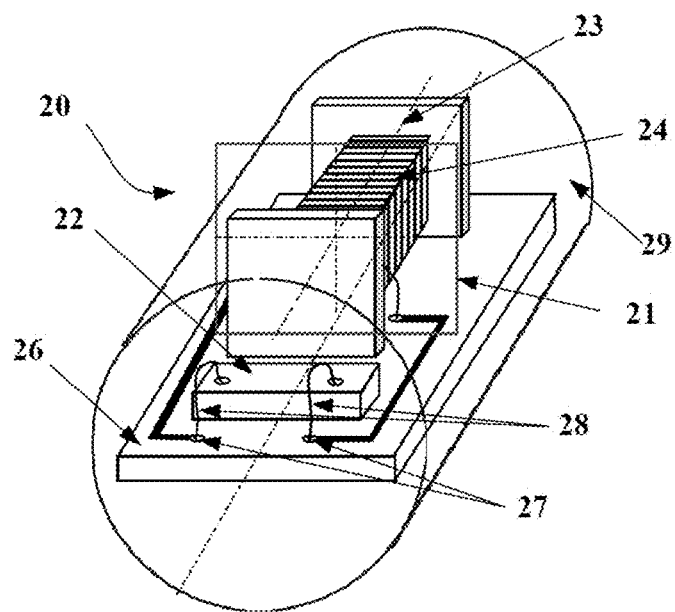
FIG. 5 is a perspective view of the electronic portion of a radio frequency transponder in a configuration in which the electronic portion is located in the interior of the radiating antenna.

FIG. 5 shows the electronic portion 20 of a radiofrequency transponder 1 intended for a configuration in which the electronic portion 20 is located in the interior of the radiating antenna 10. The electronic portion 20 comprises an electronic chip 22 and a primary antenna 24 that is electrically connected to the electronic chip 22 via a printed circuit board 26. The primary antenna here consists of a surface-mount-device (SMD) microcoil having an axis of symmetry 23. The median plane 21 of the primary antenna is defined by a normal parallel to the axis of symmetry 23 of the SMD coil and separates the coil into two equal portions. The components on the printed circuit board are electrically connected using tracks made of copper terminated by copper pads 27. The components on the printed circuit board are electrically connected using the wire-bonding technique by gold wires 28 running between the component and the pads 27. The assembly consisting of the printed circuit board 26, of the electronic chip 22 and of the primary antenna 24 is embedded in a rigid mass 29 made of electrically insulating high-temperature epoxy resin, and forms the electronic portion 20 of the radiofrequency transponder 1.

Figure 6:
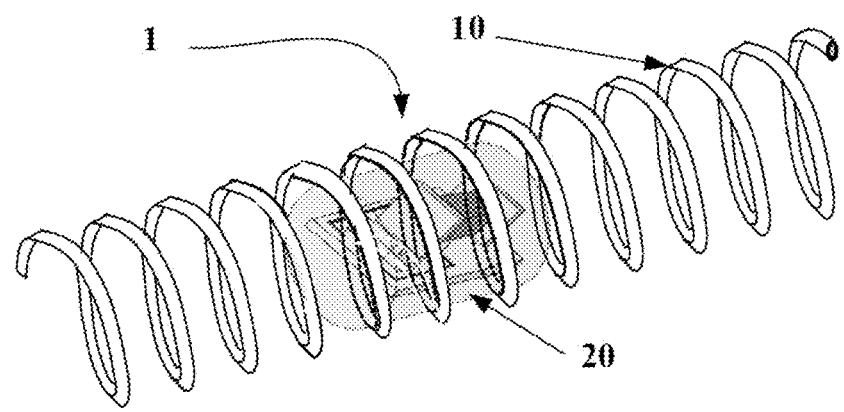
FIG. 6 is a perspective view of a radio frequency transponder according to the invention in a configuration in which the electronic portion is located in the interior of the radiating antenna.

FIG. 6 shows a radiofrequency transponder 1 in a configuration in which the electronic portion 20 is located in the interior of the radiating antenna 10. The geometric shape of the electronic portion 10 is circumscribed in a cylinder the diameter of which is smaller than or equal to the inside diameter 13 of the helical spring. The introduction of the electronic portion 20 into the radiating antenna 10 is facilitated thereby. The median plane 21 of the primary antenna is located in the central zone of the radiating antenna and substantially superposed on the median plane 19 of the radiating antenna 10.

Figure 7:
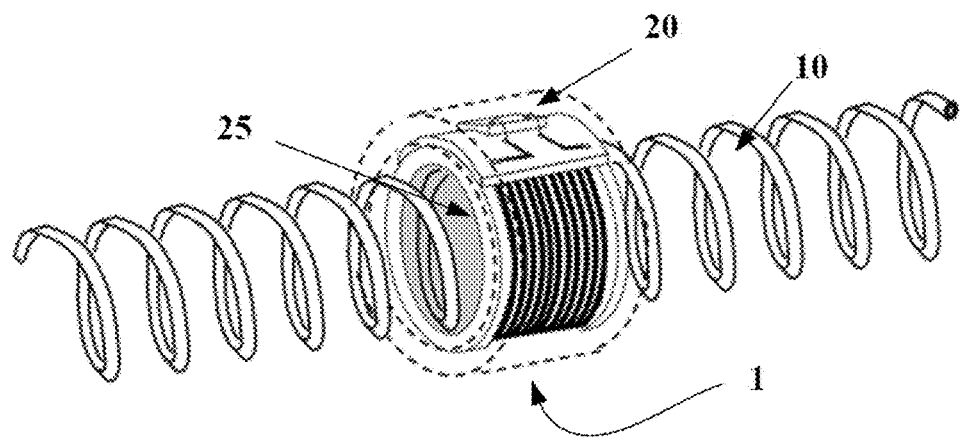
FIG. 7 is a perspective view of a radio frequency transponder according to the invention in a configuration in which the electronic portion is located on the exterior of the radiating antenna.

FIG. 7 shows a radiofrequency transponder 1 in a configuration in which the electronic portion 20 is located on the exterior of the radiating antenna 10. The geometric shape of the electronic portion 20 has a cylindrical cavity 25 the diameter of which is larger than or equal to the outside diameter 15 of the radiating antenna 10. The introduction of the radiating antenna 10 into the cylindrical cavity 25 of the electronic portion is thus facilitated thereby. The median plane 21 of the primary antenna is located in the central zone of the radiating antenna and substantially in line with the median plane 19 of the radiating antenna 10.

Figure 8:
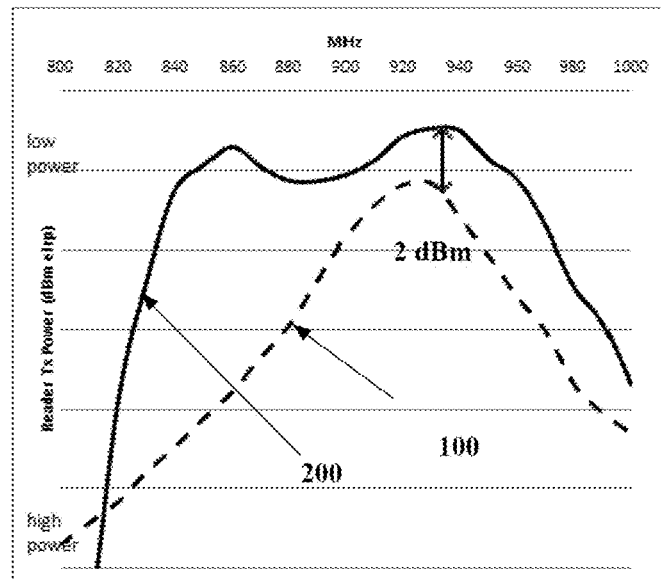
FIG. 8 is a comparison of the threshold of activation of UHF RFID tags located in the interior of a tyre.

FIG. 8 is a graph of the electrical power transmitted to a radiofrequency reader by a radiofrequency transponder located in the interior of a Michelin tyre of the XINCITY trademark and of 275/70 R22.5 dimensions. The measurement protocol employed corresponds to that of standard ISO/IEC 18046-3 entitled "Identification Electromagnetic Field Threshold and Frequency Peaks". Measurements were carried out at a wide range of scanned frequencies and not at a single frequency as conventionally is the case. The ordinate axis represents the frequency of the communication signal. The abscissa axis is the electromagnetic power radiated by the reader and its antenna, expressed in decibel-milliwatts (dBm), that allowed the chip to be turned on, i.e. its activation threshold, and therefore a response to be received from the tag. The reader is such as described in the prior art and the reference RFID tag such as described in document WO 2012030321. The dashed curve 100 represents the response of a radiofrequency transponder according to the cited document. The continuous curve 200 represents the response of a transponder according to the invention under the same measurement conditions. A gain of two dBm for example at 920 MHz in favour of the radiofrequency transponder according to the invention and an overall bandwidth larger than the prior art will be noted.

FIG. 9 is an overview of the process for manufacturing a radiofrequency communication module 2 according to the invention. To obtain the communication module 2 first a radiofrequency transponder 1 must be manufactured. The various sequential steps of the manufacture of the radiofrequency transponder 1 will now be described, then those of the identification patch 2. Steps related to the arts of telecommunications or of electronics have been clearly delineated from those of the assembly that may be carried out by the tyre manufacturer for example for an application to tyres.

There are three independent and successive phases.

In a first phase, corresponding to the art of telecommunications, the radiating antenna 10, which will ensure the transmission and reception of electromagnetic waves to and from the radiofrequency reader, is formed.

In one specific embodiment, the first step consists in plastically deforming a steel wire 12 of 200-micron outside diameter in order to form a helical spring using suitable industrial means such as a spring coiling machine. Thus, a continuous spring the outside diameter 15 of which is about 1.5 millimetres is obtained, this diameter being small with respect to the length 17 desired for the final radiating antenna, which is comprised between 35 and 55 mm and for example is 50 mm. A heat treatment may be applied after this plastic deformation step, for example a heat treatment at a temperature above 200° C. lasting at least 30 mn, in order to relax any prestresses in the helical spring thus formed.

The second step consists in cutting the helical spring by laser cutting to the desired length, this length corresponding to one half-wavelength at the frequency of the electromagnetic communication signals, given the speed of propagation of these waves, in a rubber medium, i.e. about 50 mm. The mechanical part thus obtained is the radiating antenna 10 according to the invention.

In a second phase, the electronic portion 20 of the radiofrequency transponder 1, which will interrogate the electronic chip 22 and send the response to the radiating antenna 10 is produced. The transmission of information between the radiating antenna 10 and the electronic portion 20 is achieved by inductive coupling using a primary antenna 24.

This electronic device, which is encapsulated in the rigid mass 29, is composed on the one hand of an electronic chip 22 and on the other hand of a primary antenna 24.

One embodiment of this electronic device is shown in the configuration in which the electronic portion 20 is intended to be located in the interior of the radiating antenna 10. In one preferred embodiment, the lead-frame process is employed to form the electro-mechanical carrier of the primary antenna 24 and of the electronic chip 22, the electromechanical carrier forming the equivalent of a printed circuit board 26. This process is particularly well suited to this configuration because it lends itself well to miniaturization.

The first step consists in forming the electronic board. To do this, the electronic chip 22 is firstly fastened to the lead frame using a conductive adhesive, for example the adhesive H20E from Tedella. Next, the chip is connected by wire bonding, i.e. an electrical bridge is produced between the electronic chip 22 and the printed circuit board 26 that the lead frame may be said to represent using, for example, gold wires 28 of 20-micron diameter. It is then possible to measure the electrical impedance of the electronic board at the points at which the primary antenna 24 is fastened to the lead frame using a suitable electrical device such as an impedance meter.

The second step consists in producing the primary antenna 24. Here this antenna consists of a coil of circular turns that is constructed directly on the lead frame in wire-bonding technology. To do this, a gold wire of 20-micron diameter is employed, though aluminium or palladium-coated copper wire could also have been used, to produce the half-turns of the coil on the back side of the lead frame. The diameter of each of these half-turns is 600 microns, and the ultrasound technology conventionally used in the semi-conductor industry is used to electrically connect the gold wires and the lead frame. Next, on the front side of the lead frame, the other half-turns are produced in order to obtain a cylindrical coil of 15 turns of 600-micron diameter.

The number of turns of the primary antenna 24 is defined such that the electrical impedance of the primary antenna 24 is matched to the electrical impedance of the electronic board, which comprises at least the printed circuit board 26 that the lead frame may be said to represent and the electronic chip 22. In our case, the electrical impedance of the electronic chip 22 alone is a complex number that has, for example, a value of (10−j*150) ohms. Thus, a coil of 15 turns of 400-micron diameter corresponds to a good match to the electrical impedance of the electronic board constructed with a copper lead frame.

The last step of production of the electronic portion 20 consists in encapsulating the lead frame and the components that are connected thereto in a rigid mass 29, using a high-temperature epoxy resin. To do this, the globtop technology will be employed. This technology consists in depositing the resin, such as the MONOPDX GE780 resin from DELO, in the liquid state, using means, such as a syringe, for applying suction and dispensing. This operation is carried out in a conventional microelectronics-industry environment such as a cleanroom. Next, the liquid resin is polymerized by way of an ultraviolet lamp that generates a temperature of at least 130° C. and that accelerates the polymerization of the resin in order to achieve a chemical reaction time of about one minute. The rigid mass 29 resulting here from this polymerization forms a capsule enclosing the lead frame and the electronic components, which may be said to represent the electronic board of the radiofrequency transponder 1.

The third phase of production of the radiofrequency transponder 1 consists in assembling the radiating antenna 10 produced in the first step with the electronic portion 20 produced in the second step.

In the first configuration in which the primary antenna 24 is intended to be located in the interior of the radiating antenna 10, the procedure is as follows.

Firstly, suitable needle-nose tweezers are used to pick up the electronic portion 20, which electronic portion is inscribed in a cylinder the diameter of which is smaller than or equal to the inside diameter 13 of the radiating antenna 10 produced in the first step, i.e. to about 1 millimetre.

The electronic portion 20 is inserted into the interior of the radiating antenna 10 so that the axis of symmetry 23 of the primary antenna is positioned in the direction of the axis of revolution 11 of the radiating antenna 10. The electronic portion 20 is then moved deeper into the radiating antenna 10, until the median plane 21 of the primary antenna coincides with the median plane 19 of the radiating antenna. Next, the electronic portion 20 is released from the needle-nose tweezers and the tweezers are delicately removed from the interior of the radiating antenna 10.

Self centring, i.e. parallelism of the axes and a relative position of the median planes of the radiating antenna 10 and of the primary antenna 24, is thus achieved, this being favourable to the obtainment of quality inductive coupling between the two antennas.

According to one optimized embodiment, a split pin is used as a part to facilitate the positioning of the radiating antenna 10 and the primary antenna 24. It is for example a question of a tubular pin made of a flexible and electrically insulating material such as for example a rubber blend. This pin has a slit extending along the length of the tube and cylindrical orifices located in its thickness at one of the ends thereof along the axis of the pin. Ideally, the pin is equipped with a mark on its external face that identifies the median plane 21 of the primary antenna, when the electronic portion 20 is housed in the interior of the pin. This tube possesses inside and outside diameters that respectively correspond to the outside diameter circumscribed by the electronic portion 20 and to the perfectly fitted inside diameter 13 of the radiating antenna 10. The electronic portion 20 is inserted into the interior of the slit tube by moving the pin apart so as to open the slit. The electronic portion 20 is placed such that the axis of symmetry 23 of the primary antenna 24 is parallel to the axis of the pin and so that the median plane 21 of the primary antenna 24 is coincident with the mark on the external face of the pin.

Next, the pin, picked up beforehand with a pair of long-reach tweezers each end of which is accommodated in one of the cylindrical orifices of the pin, is guided using the tweezers into the interior of the radiating antenna 10 in order that, on the one hand, the mark on the external face of the pin coincides with the median plane 19 of the radiating antenna, and so that, on the other hand, the axis of the pin is parallel to the axis of revolution 11 of the radiating antenna 10. Closing the long-reach tweezers closes the slit of the pin, facilitating introduction of the pin into the radiating antenna 10. Once in place, the long-range tweezers are opened, allowing the pin to return to its initial position, and thus causing the pin to be retained in the radiating antenna 10. It is then enough to remove the ends of the tweezers from the orifices of the pin and to delicately remove the tweezers.

The assembly thus formed is a radiofrequency transponder 1.

The last step, once the radiofrequency transponder 1 has been produced, is to obtain a semi-finished product or radio-frequency communication module 2 in order to facilitate use of the radiofrequency transponder 1 in objects to be identified partially consisting of rubber blends. Whatever the configuration of the radiofrequency transponder 1, this step is carried out in the following way.

The radiofrequency transponder 1 formed in the preceding step is placed between two layers of rubber blends 3*a* and 3*b*. The radiofrequency transponder 1 is sandwiched between two parallelepipeds of green rubber blend the characteristic dimensions of which, which dimensions are adapted to the dimensions of the radiofrequency transponder, are as follows: a length comprised between 40 and 80 millimetres, a width comprised between 5 and 15 millimetres and a thickness ideally of 3 millimetres but at least comprised between 2 and 5 millimetres. The longitudinal direction of the parallelepiped corresponds to the axis of the radiating antenna 10. The assembly is located beforehand on the internal face of a metal die of a pressing tool of dimension adapted to the volume of the semi-finished product.

Using a metal punch complementary to the die, a compressive force of 1000 newtons is applied, by means of a pressing tool, for example a pneumatic uniaxial press, to the assembly in order to form a compact geometry having an axis of symmetry, of length for example of 60 millimetres, inscribed in a cylinder of diameter of about 20 millimetres corresponding to a radiofrequency communication module 2 of the radiofrequency transponder 1.

In one particular embodiment, adhesion promoters are employed to promote adhesion between the rigid mass 29 made of high-temperature epoxy resin encapsulating the electronic portion 20 of the radiofrequency transponder 1 and the rubber blend of the identification patch 2. An adhesion promoter such as a chemosil from the CHEMOSIL range by Lord Corp is applied by spraying to the external face of the electronic portion 20 before the radiofrequency transponder 1 is sandwiched between the two layers of rubber blend 3a and 3b.

Finally, the industrial implementation of an identification module 2 according to the invention in an object to be identified such as a tyre casing may be carried out according to at least two embodiments. In a first preferred embodiment, it is enough to incorporate the green rubber blend identification module 2 into the green tyre during the production of the casing. The identification module 2 is geometrically placed between the various rubber components of the green blank of the green tyre. Ideally, it is placed in a zone of the tyre that undergoes acceptable levels of deformation so that the radiating antenna 10 is not plastically deformed. The green tyre undergoes various manufacturing phases including curing in an autoclave, setting the structure of the identification module 2 and securing it to the tyre thus produced. The identification module 2 of the tyre casing is then ready to be used.

Another preferred embodiment consists in setting the rubber structure of the identification module 2 by cross-linking or vulcanization in a step subsequent to the manufacture of the identification patch 2. The device obtained following this operation is incorporated into the tyre casing using a conventional rubber/rubber fastening technique known to those skilled in the art, such as, for example, adhesion by cross-linking cold to the inner liner of the tyre casing using a conventional cold-vulcanizing bonding rubber, such as Gray gum supplied by Tech International. The identification module 2 of the tyre casing is then ready to be used.

Figure 10:
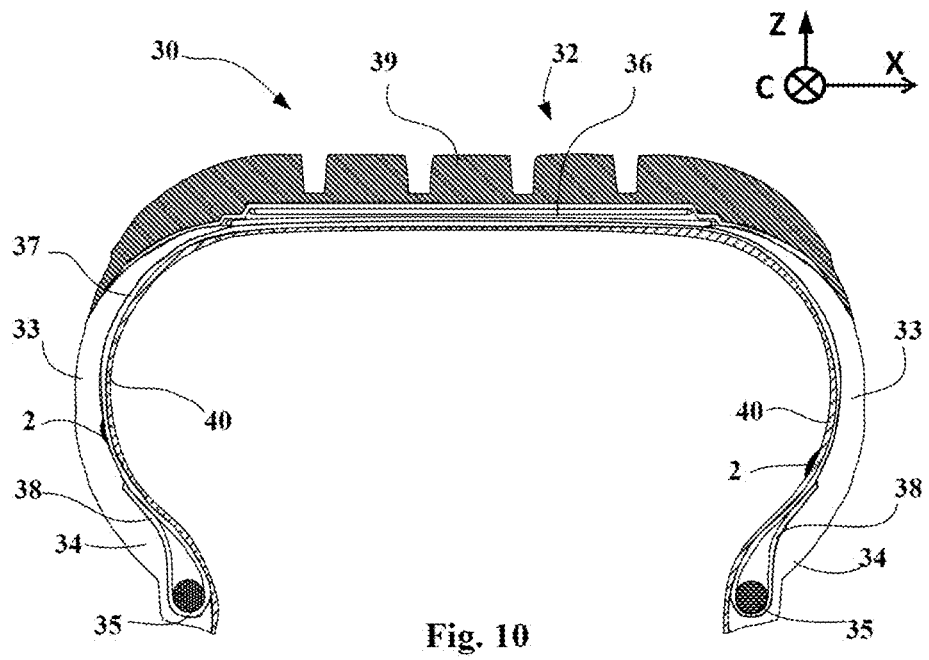
FIG. 10 illustrates in axial cross section a tyre comprising a radiofrequency module placed in its structure and a radiofrequency module fastened by adhesive bonding to its internal wall.

FIG. 10 shows in axial cross section a tyre comprising, in its structure, a radiofrequency communication module placed according to the two embodiments described above.

FIG. 10 indicates the axial X, circumferential C and radial Z directions and also the median plane EP (plane perpendicular to the axis of rotation of the tyre which is situated halfway between the two beads 4 and passes through the middle of the crown reinforcement 6).

This tyre 30 comprises a crown 32 reinforced by a crown reinforcement or belt 36, two sidewalls 33 and two beads 34, each of these beads 34 being reinforced with a bead wire 35. The crown reinforcement 36 is surmounted radially on the outside by a rubber tread 39. A carcass reinforcement 37 is wound around the two bead wires 35 in each bead 34, the turn-up 38 of this reinforcement 37 being, for example, arranged towards the outside of the tyre 30. In a manner known per se, the carcass reinforcement 37 is made up of at least one ply reinforced by what are known as "radial" cords, for example of textile, that is to say that these cords are disposed virtually parallel to one another and extend from one bead to the other so as to form an angle of between 80° and 90° with the median circumferential plane EP. An airtight inner liner 40 extends from one bead to the other radially on the inside with respect to the carcass reinforcement 37.

This tyre 30 comprises, by way of illustration, a communication module 2 placed at the interface between the rubber blend forming the sidewall 33 and the carcass ply 37. The illustrated position is radially external to the end of the turn-up 38 of the carcass ply 37 but under the middle of the sidewall 33. This position is excellent for the radiofrequency communication between the transponder and an exterior reader and the very good robustness of the radiofrequency transponder of the communication module allows it to withstand without damage the high mechanical stresses related to running.

The tyre 30 also comprises a communication module in its pre-vulcanized configuration and fastened to the inner liner 40 of the tyre by means of a conventional cold-vulcanizing bonding rubber, such as Gray gum sold by Tech International. These communication modules were fastened to the tyre after its manufacture, for example in preparation for retreading of the tyre.

The invention claimed is:

1. A radiofrequency communication module or semi-finished product able to be integrated into the structure of a tire, the radiofrequency communication module comprising:
    a radiofrequency transponder embedded in a rubber blend and comprising an electronic chip, a radiating antenna configured to communicate with a radiofrequency reader, and a primary antenna that is electrically connected to the electronic chip and electromagnetically coupled to the radiating antenna,
    wherein the radiating antenna consists of a single-strand helical spring, and
    wherein the single-strand radiating antenna has a core made of steel with a metal exterior adhesion layer for adhesion to the rubber blend that surrounds it.

2. The radiofrequency communication module according to claim 1, wherein, the metal exterior adhesion layer of the single-strand radiating antenna is selected from the group consisting of cobalt, zinc, nickel, aluminum, tin, copper, and an alloy of two or more of these.

3. The radiofrequency communication module according to claim 1, wherein the rubber blend comprises an adhesion promoter for promoting adhesion with the metal exterior adhesion layer of the single-strand radiating antenna.

4. The radiofrequency communication module according to claim 3, wherein the adhesion promoter is a salt of cobalt or of nickel.

5. The radiofrequency communication module according to claim 1, wherein, the radiating antenna defining a first longitudinal axis, the primary antenna is a coil having at least one turn defining a second longitudinal axis that is circumscribed in a cylinder, an axis of revolution of which is parallel to the second longitudinal axis and a diameter of which is comprised between one third and three times an average diameter of the helical spring of the single-strand radiating antenna.

6. The radiofrequency communication module according to claim 5, wherein, the radiating antenna having a central zone between two lateral zones and the primary antenna having a median plane perpendicular to the second longitudinal axis, the first and second longitudinal axes are parallel to each other and the median plane of the primary antenna is placed in the central zone of the radiating antenna.

7. The radiofrequency communication module according to claim 1, wherein the primary antenna is placed in an interior of the single-strand helical spring of the radiating antenna.

8. The radiofrequency communication module according to claim 1, wherein the rubber blend in which the radiofrequency transponder is embedded is formed from two layers, and
    wherein the radiofrequency transponder is placed between the two layers.

9. The radiofrequency communication module according to claim 8, wherein, the radiating antenna defining an axial orientation of the radiofrequency communication module, the two layers are of same dimensions and are arranged staggered in a direction normal to the axial direction.

10. The radiofrequency communication module according to claim 8, wherein, the radiating antenna defining an axial direction of the radiofrequency communication module and the two layers being of parallelepipedal shape and an upper layer of the two layers being of smaller width, in any section normal to the axial direction, an angle between a lower surface of the radiofrequency communication module and a tangent passing through upper ends of the two layers is smaller than 40 degrees.

11. The radiofrequency communication module according to claim 1, wherein the rubber blend in which the radiofrequency transponder is embedded is an electrically insulating blend.

12. The radiofrequency communication module according to claim 1, wherein the rubber blend is not vulcanized.

13. The radiofrequency communication module according to claim 1, wherein the rubber blend is at least partially vulcanized.

14. The radiofrequency communication module according to claim 1, wherein the rubber blend has a dielectric constant at 915 MHz lower than 6.5.

15. A process for manufacturing an assembly consisting of a tire and a radiofrequency transponder comprising the steps of:
    adding the radiofrequency communication module according to claim 1 to the surface of a constituent of the tire;
    successively placing the constituents of the tire, including the constituent to which the radiofrequency communication module has been added, on an assembling tool in order to form a green tire; and
    vulcanizing the green tire in order to obtain a vulcanized tire comprising in its structure a radiofrequency transponder.

16. A tire comprising in its structure or on its wall a radiofrequency communication module according to claim 1.

17. The tire according to claim 16, wherein the tire is new or retreaded.

* * * * *